United States Patent [19]

Cross et al.

[11] Patent Number: 5,517,635
[45] Date of Patent: May 14, 1996

[54] SYSTEM FOR DESIGNING AN APPLICATION PROGRAM TO BE INDEPENDENT OF I/O DEVICES BY UTILIZING APPLICATION NAME, SYSTEM NAME, AND PREDETERMINED HARDWARE SPECIFIC PARAMETERS OF DATA OBJECTS

[75] Inventors: Charles W. Cross, Charlotte, N.C.; Mark E. Trumbo, North Vancouver, Canada

[73] Assignee: International Business Machines Corporation, Armonk, N.Y.

[21] Appl. No.: 991,882

[22] Filed: Dec. 17, 1992

[51] Int. Cl.⁶ .................. G06F 3/00; G06F 5/00
[52] U.S. Cl. .................. 395/500; 364/274.1; 364/274.2; 364/274.5; 364/DIG. 1; 364/274.8; 364/275; 364/275.1; 364/275.8; 364/276.5; 364/280.4
[58] Field of Search .................. 395/275, 200, 395/700, 500

[56] References Cited

U.S. PATENT DOCUMENTS

| | | | |
|---|---|---|---|
| 3,846,763 | 11/1974 | Riikonen | 340/172.5 |
| 4,315,310 | 2/1982 | Bayliss et al. | 364/200 |
| 4,322,792 | 3/1982 | Baun | 364/200 |
| 4,586,158 | 4/1986 | Brandle | 364/900 |
| 4,631,666 | 12/1986 | Harris et al. | 364/200 |
| 4,672,532 | 6/1987 | Jongevos | 364/200 |
| 4,734,856 | 3/1988 | Davis | 364/300 |
| 4,831,583 | 5/1989 | Pascoe | 364/900 |
| 4,855,905 | 8/1989 | Estrada et al. | 364/200 |
| 4,858,114 | 8/1989 | Heath et al. | 364/200 |
| 4,864,492 | 9/1989 | Blakely-Fogel et al. | 364/200 |
| 4,905,138 | 2/1990 | Bourne | 364/200 |
| 4,943,932 | 7/1990 | Lark et al. | 364/513 |
| 4,949,302 | 8/1990 | Arnold et al. | 364/900 |
| 4,962,475 | 10/1990 | Hernandez et al. | 364/900 |
| 4,974,151 | 11/1990 | Advani et al. | 364/200 |
| 5,014,187 | 5/1991 | Debize et al. | 364/200 |
| 5,083,262 | 1/1992 | Hoff, Jr. | 395/500 |
| 5,161,222 | 11/1992 | Montejo et al. | 395/500 |
| 5,165,030 | 11/1992 | Barker | 395/500 |
| 5,220,654 | 6/1993 | Benson et al. | 395/275 |
| 5,261,080 | 11/1993 | Khoyi et al. | 395/500 |
| 5,291,585 | 3/1994 | Sato et al. | 395/500 |

FOREIGN PATENT DOCUMENTS

| | | |
|---|---|---|
| 61-145641 | 7/1986 | Japan . |
| 61-234435 | 10/1986 | Japan . |
| 2-71333 | 3/1990 | Japan . |
| 62-14278 | 8/1994 | Japan . |

*Primary Examiner*—Thomas C. Lee
*Assistant Examiner*—Le Hien Luu
*Attorney, Agent, or Firm*—Calfee, Halter & Griswold; Karl O. Hesse; Kenneth A. Seaman

[57] ABSTRACT

A system and a method for inputting/outputting device specific data that does not bind I/O device specific information to the application program until runtime is provided. This allows an application program developer to support a new I/O device without redesigning the application program to accommodate the new information and then compiling the new version of the application program. The system includes an Object Input/Output Manager (OIOM), a device dictionary, a plurality of I/O device modules, a plurality of I/O devices, and an I/O channel. The OIOM controls the overall flow of the system. The device dictionary and the I/O device modules contain I/O device specific information that is not known to the application program at the time it is compiled. When an application program needs to input or output device specific data, the user is presented with a list of I/O devices and selects one. After receiving the user's selection, the application program commands the OIOM to input or output the device specific data. The OIOM then gets the system name of the I/O device, loads the corresponding I/O device module, adds the I/O device specific information to the data object, and commands the I/O device module to input or output the data object. After the data object has been input or output, control passes back to the OIOM and finally to the application program.

12 Claims, 4 Drawing Sheets

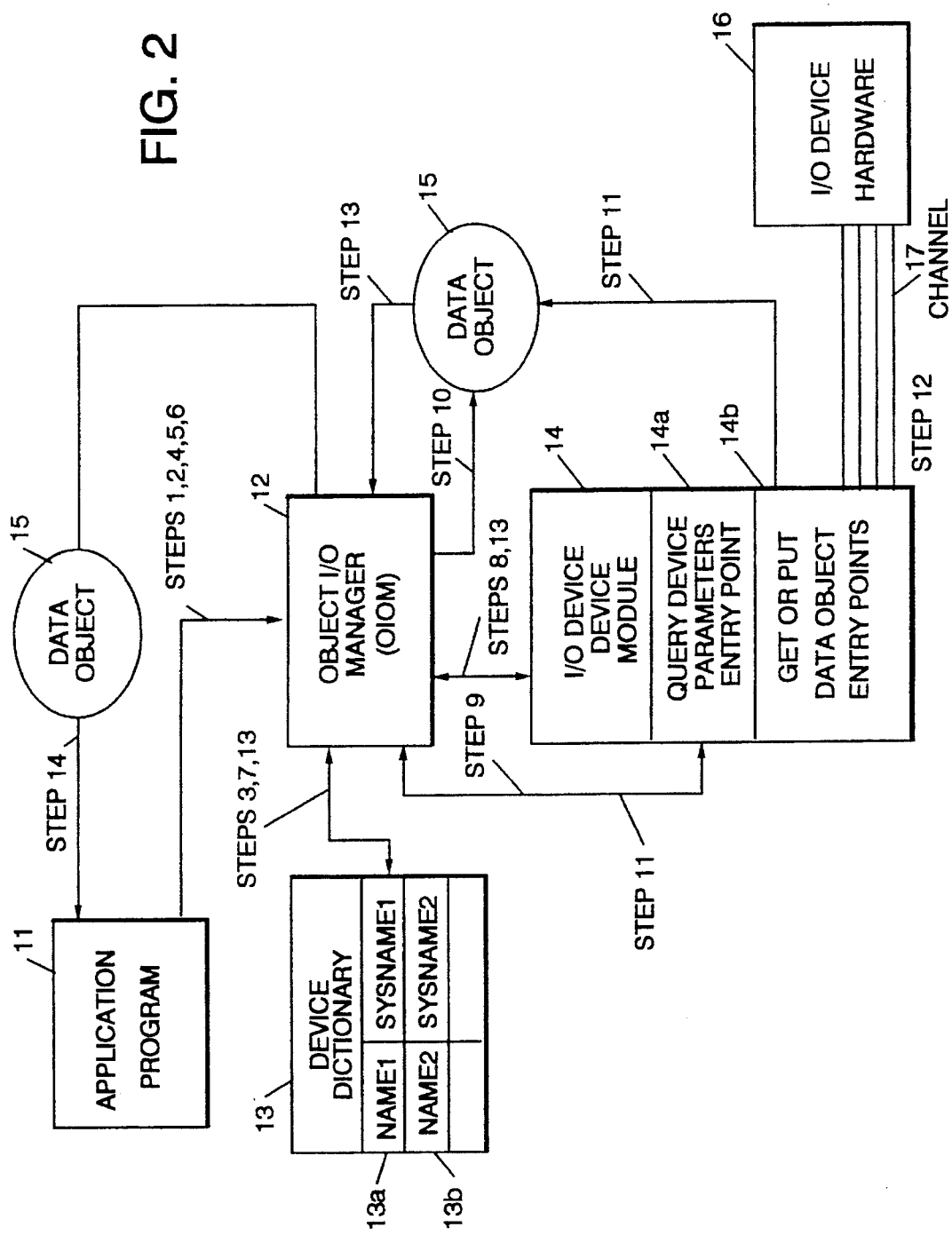

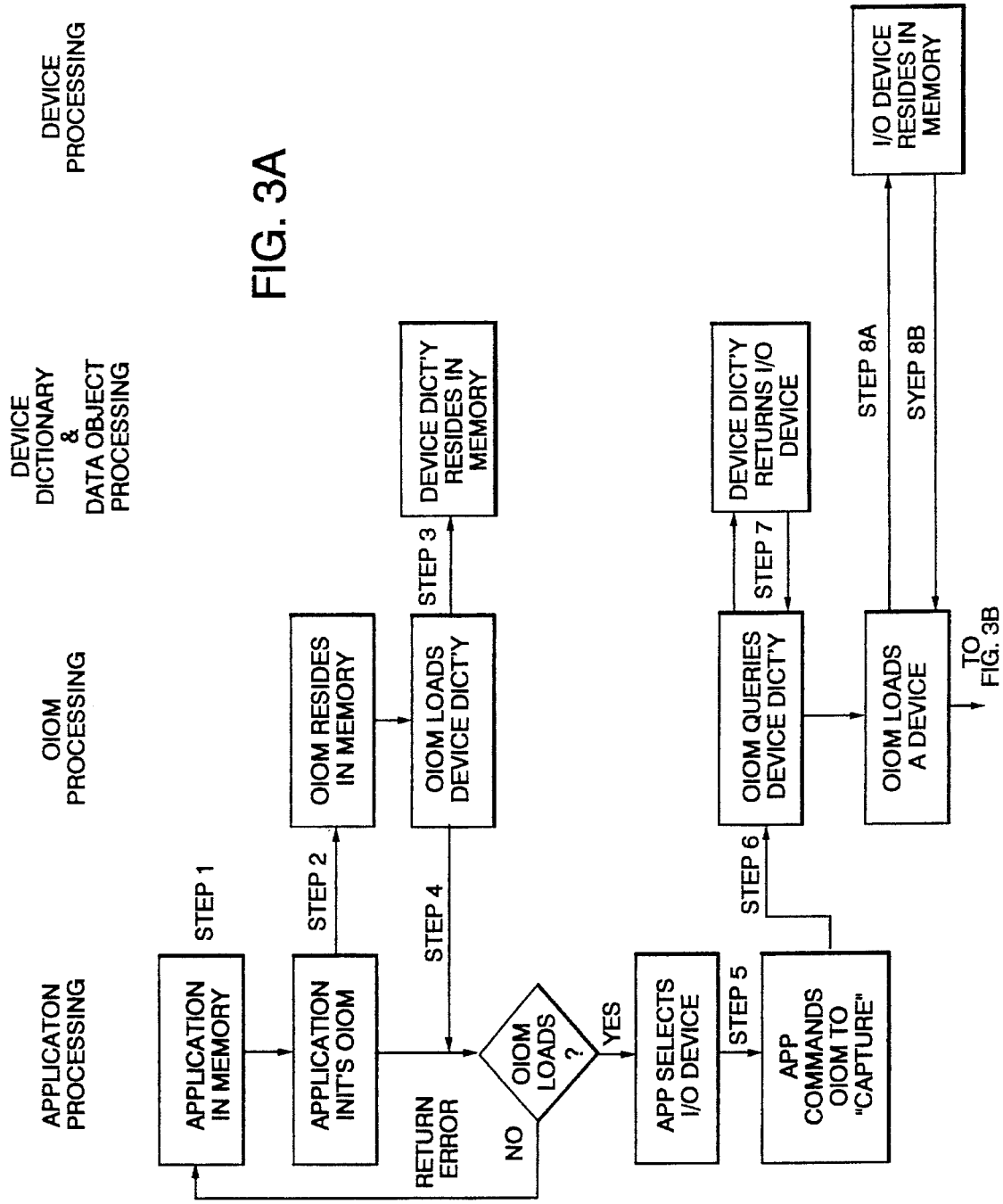

SYSTEM FOR DESIGNING AN APPLICATION PROGRAM TO BE INDEPENDENT OF I/O DEVICES BY UTILIZING APPLICATION NAME, SYSTEM NAME, AND PREDETERMINED HARDWARE SPECIFIC PARAMETERS OF DATA OBJECTS

FIELD OF THE INVENTION

The present invention relates to a system and a method for inputting device specific data to, and outputting device specific data from, an application program which permit the application program to be written independent of the particular I/O device being used. More particularly, the present invention relates to a system and a method for inputting device specific data to, and outputting device specific data from, an application program that do not bind I/O device specific information to the application program until runtime. Thus, the system and the method of the present invention permit different I/O devices to be utilized with a single application program.

BACKGROUND OF THE INVENTION

Device independent I/O is a well established concept in standard data communication and file I/O. Standard file I/O interfaces and communications protocols protect application programs from expensive source level changes due to changes in I/O device hardware and I/O device driver software. However, the past approaches have only been applicable to situations where the underlying data is the same from one I/O device to the next. For example, regardless of the different methods of physically storing and communicating files from the storage medium through the I/O device, a file is ultimately rendered as a stream of bytes to the application program. In contrast, there is another class of data I/O where the fundamental nature of the data changes depending on the I/O device from which the data is obtained. Digital images are an example of such a class of data I/O. One I/O device (a digital camera) may provide a binary image where each pixel is represented by a single bit. Another camera may capture a grey level image where each pixel is represented by a byte. An image from a color camera has three one byte values for the primary colors for each pixel. Additionally, manufacturers of these image I/O devices follow many different communications standards for I/O with the application program, such as pseudo file I/O, IEEE-488, and RS232. However, regardless of the structure of the data or the means of physical I/O, there are many operations which are semantically unaffected by the differences in the source or nature of the data. Several examples of such operations are "capture" an image, "display" an image, and "measure a feature" in an image. Another example of the class of data I/O that changes with the physical devices is data obtained from or output to motion control devices used in manufacturing automation or robotics.

For the class of data I/O where the fundamental nature of the data changes depending on the I/O device from which the data is obtained (i.e., device specific data), device independent I/O had not previously been accomplished. Application programs that input or output device specific data had to use special I/O devices installed on adapter cards which were interfaced to the computer channel. These special devices required application programs to have knowledge of I/O device specific information when inputting, processing, and outputting device specific data. In the past, this information had to be bound to the application program when it was compiled. Moreover, the application program had to be designed around this information. In order to support a new I/O device, the application program developer had to redesign the application program to accommodate the new information and then compile the new version of the application program.

As should be apparent from the foregoing discussion, inputting device specific data to, or outputting device specific data from, an application program using a new I/O device could be extremely time consuming and expensive. Typically, the application program developer had to redesign virtually the entire application program. This could be true even if there were only minor differences between the original I/O device and the new I/O device. Thus, as the size and complexity of the application program increased, the time and expense of redesigning the application program increased. Therefore, a need existed to reduce the time and expense of supporting a new I/O device in an application program, preferably by designing the application program to be independent of the I/O device and binding the I/O device specific information to the application program at runtime instead of when it is compiled.

SUMMARY OF THE INVENTION

The present invention reduces the time and expense of supporting a new I/O device in an application program, preferably by designing the application program to be independent of the I/O device and binding the I/O device specific information to the application program at runtime instead of when it is compiled. Generally, the present invention provides a system and a method for inputting device specific data to, and outputting device specific data from, an application program that do not bind I/O device specific information to the application program until runtime. Consequently, the application program developer does not have to redesign the application program to accommodate the new information and then compile the new version of the application program in order to support a new I/O device.

More particularly, the present invention provides a system that includes an Object Input/Output Manager (OIOM), a device dictionary, a plurality of I/O device modules, a plurality of I/O devices, and an I/O channel. The OIOM controls the overall flow of the system. The device dictionary and the I/O device modules contain I/O device specific information that is not known to the application program at the time it is compiled. When an application program needs to input or output device specific data, the user is presented with a list of I/O devices and selects one of the I/O devices. After receiving the user's selection, the application program commands the OIOM to input or output the device specific data. The OIOM then gets the system name of the I/O device, loads the corresponding I/O device module, adds the I/O device specific information to the data object, and commands the I/O device module to input or output the data object. After the data object has been input or output, control passes back to the OIOM and finally to the application program.

These and other features of the present invention are fully described and particularly pointed out in the claims. The following detailed description and accompanying drawings set forth in detail an illustrative embodiment. However, this embodiment is indicative of but one of the various ways in which the principles of the present invention may be employed.

BRIEF DESCRIPTION OF THE DRAWINGS

FIG. 2 is a schematic illustration of the components of the system of the present invention; and FIGS. 3A and 3B collectively are a schematic illustration of the operation of the system and the method of the present invention.

DETAILED DESCRIPTION OF THE PREFERRED EMBODIMENT

Figure 1:
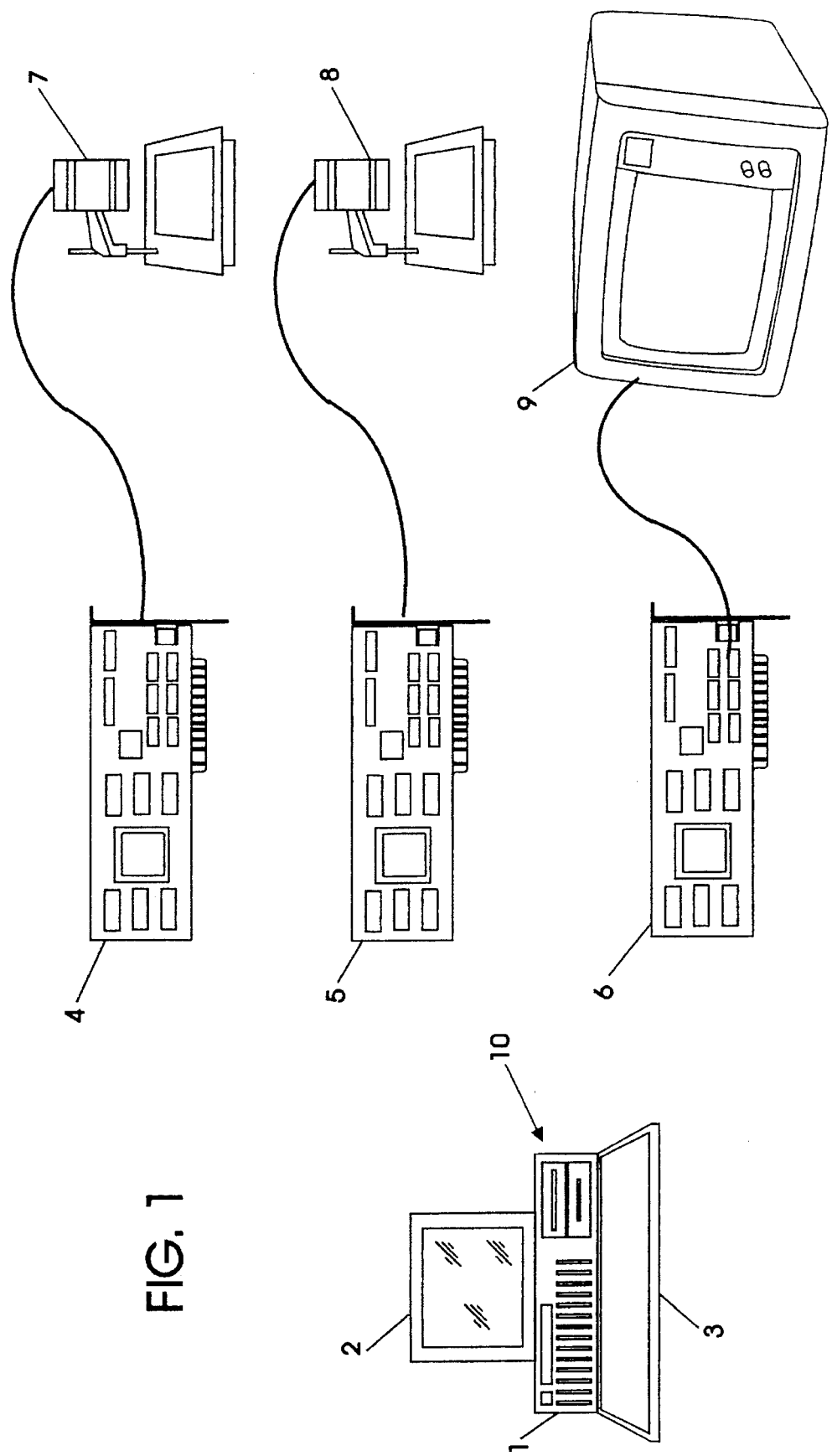
FIG. 1 is a schematic illustration of one possible hardware configuration in which the system and the method of the present invention can be employed.

Referring now to the drawings and initially to FIG. 1, a schematic illustration of one possible hardware configuration in which the system and the method of the present invention can be employed is shown. A computer system, indicated generally at 10, used for running application programs includes a main processing unit 1, a standard display 2, and a keyboard 3. The main processing unit 1 typically includes a hard disk drive, a floppy disk drive, an input/output (I/O) bus, and random access memory (RAM). The standard display 2 is the primary display which the computer operating system uses to communicate with a user. The keyboard 3 is used by the main processing unit 1 to accept alphanumeric input from the user.

An application program can be written to accept input from or direct output to an I/O device which is attached to the computer system 10 via an I/O channel adapter 4, 5, or 6. (The I/O channel adapter is manufactured separately from the computer system and is installed in the computer system using conventional techniques.) Several I/O devices which are common to image processing applications are digital cameras 7 and 8 and special displays 9.

FIG. 2 is a schematic illustration of the components of the system of the present invention. (The steps referred to in FIG. 2 indicate the sequence of processing carried out during the operation of the system and the method of the present invention. These steps are shown in greater detail in FIG. 3.) The system enables an application program developer to support a new I/O device without having to redesign the application program to accommodate the new I/O device specific information and then compile the new version of the application program. Specifically, the system enables the application program developer to isolate the I/O device specific information and design the application program to be independent of the I/O device. The I/O device specific information is then bound to the application program at runtime.

The system includes an Object Input/Output Manager (OIOM) 12, a device dictionary 13, a plurality of I/O device modules 14, a plurality of I/O devices 16, and an I/O channel 17. The system enables an application program 11 to input or output a data object 15 to or from a selected I/O device 16.

The OIOM 12 is implemented as a subroutine library of object modules containing function calls for data object I/O that are coded in the application program 11. Examples of these function calls for an image processing application are "InitializeSystem," "CaptureImage," and "DisplayImage." Besides coding these function calls, the application program 11 must also code the format of the data object 15 that is returned by these calls. This format is a generalized description of the data object 15 with a "header" section that allows the application program 11 to interpret the exact contents of the data object 15 according to parameters that may change as the result of obtaining the data from different I/O devices 16. The values of these parameters are not known to the application program 11 until the I/O device module 14 is queried for these parameters by the OIOM 12. The OIOM function calls and the format of the data object 15 without the I/O device specific parameters are compiled and linked into the application program 11.

The device dictionary 13 is a data object created dynamically by the OIOM 12 when the OIOM 12 is initialized by the application program 11. It consists of the application name, the system name, and any I/O device specific parameters for a particular I/O device 16. The OIOM 12 creates an entry in the device dictionary 13, e.g., 13a and 13b, for each I/O device 16 found by the OIOM 12 upon initialization of the OIOM 12 by the application program 11.

An I/O device module 14 must be created for each type of I/O device 16 the application user wishes to use. Each I/O device module 14 has specific entry points or function calls, that are known to the OIOM 12 by name, i.e., coded into the OIOM 12 and compiled but not linked, e.g., 14a and 14b. These function calls are the points in the system where I/O device specific code has been isolated. For example, the "Query Device Parameters" entry point 14a returns to the OIOM 12 information about the format of the data object 15 that can be input from or output to the I/O device 16. The "Get Data Object" or "Put Data Object" entry points 14b are used to execute the code that performs the actual physical I/O with the I/O device 16 over the I/O channel 17.

The I/O device modules 14 are implemented as Dynamic Link Libraries (DLL's) in the OS/2 operating system. The function calls in the I/O device modules 14 are resolved by the OIOM 12 at runtime as the result of an event in the application program 11 which causes a specific I/O device module 14 to be loaded by the OIOM 12. I/O device modules 14 may be coded and compiled separately from an application program 11, allowing the application program 11 to be extensible to other I/O devices 16 without change to the application program 11.

A data object 15 is created by the OIOM 12 in the main memory of the computer system 10. The general description of a class of a data object 15 is known to the application program 11 when it is compiled and linked. However, there are many parameters whose values are I/O device specific and are therefore not resolved until a particular I/O device 16 is selected. These values are placed in the "header" of the data object 15 by the OIOM 12 and are used by the application program 11 to interpret the data object 15.

Figure 3B:
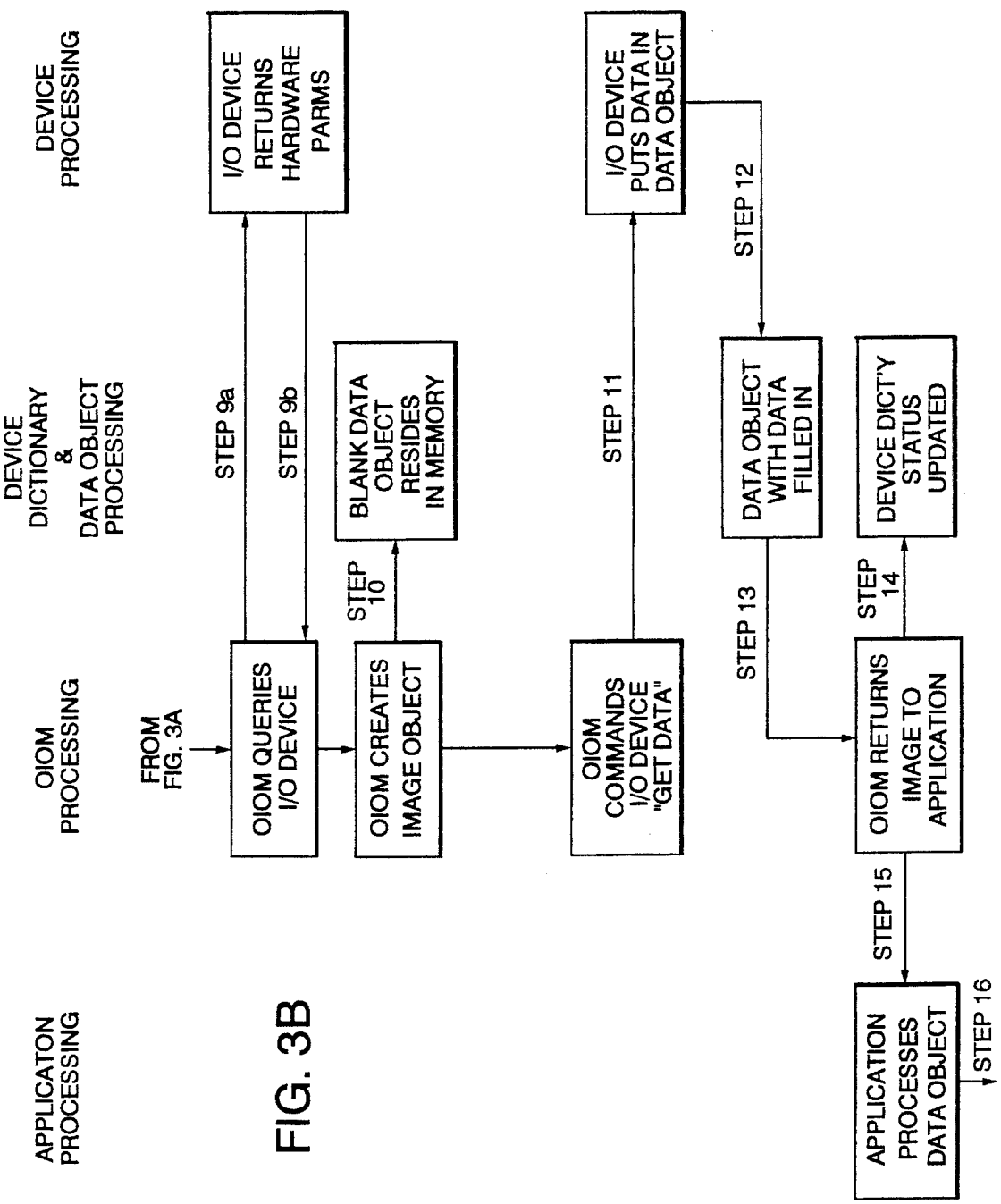

FIGS. 3A and 3B collectively are a schematic illustration of the operation of the system and the method of the present invention in greater detail. (The steps referred to in FIGS. 3A and 3B indicate the sequence of processing carried out during the operation of the system and the method of the present invention. The numbers of these steps correspond to the numbers of the steps in FIG. 2.) Initially, a user starts the application program 11 on the computer system 10 by entering the name of the program at the operating system command prompt (step 1). The application program 11 initializes the OIOM 12 through a statically bound function call to the OIOM 12 (step 2). The OIOM 12 then loads the device dictionary 13 which resides in memory and passes a list of valid I/O devices 16 back to the application program 11 (steps 3 and 4).

The OIOM 12 loads the device dictionary 13 by first reading a sub-directory in the computer file system to obtain a list of available I/O device modules 14 which have previously been loaded therein. The OIOM 12 then dynamically allocates a data structure consisting of a list of application names and the corresponding system names of the I/O devices 16. The system name of each I/O device 16 is the address of the I/O device module 14 after it has been dynamically loaded by the OIOM 12. In OS/2, this is done with the DosLoadModule routine and the system name is the address of the I/O device module 14 returned by that function call. The application name of each I/O device 16 is obtained by the OIOM 12 executing a specific entry point in each I/O device module 14. The application name acts as a key to the device dictionary 13 and the means for the application program 11 to communicate to the OIOM 12 which I/O device 16 it "wants" to use.

Next, the OIOM 12 returns control to the application program 11 and passes it a list of the application names by assigning that list to a return parameter of the initialization function call. Alternatively, after the OIOM 12 has been initialized, the application program 11 can get the list of valid I/O device names by issuing another function call that returns the list.

At some point, the application program 11 needs to input data to, and/or output data from, an I/O device 16 and process the data using information that is I/O device specific and not known to the application program 11 when it was compiled. For example, in an image processing application program, a user may wish to capture an image on which to have the application program 11 perform operations and calculations. At that point, the application program 11 presents the list of valid I/O devices 16 to the user and the user selects the I/O device 16 from which the user wishes to capture the image (step 5).

In this image processing application program example, there is a lot of I/O device specific information that is not known to the application program 11 when it is compiled. This information may vary depending on the type of I/O device 16 being used. For example, the length and width in pixels of the image and the resolution of each pixel depend on the type of I/O device 16 used to capture the image. Additionally, different I/O devices 16 can capture the image as black and white, grey level, or color. The structure of the data, and therefore the processing of the data, is different for each case. Finally, there is no standard for communication with the I/O devices 16 so that the programming interface provided for each I/O device 16 by its manufacturer to capture (input) or display (output) the data is different for each I/O device 16. These differences between I/O devices 16 require an application program 11 to execute different instructions for the same operation on different I/O devices 16. The OIOM 12 implements a protocol for the execution of these unique I/O device specific instructions in each I/O device module 14.

After receiving the user's I/O device selection, the application program 11 commands the OIOM 12, through a statically bound function call, to input or output the data object 15 with the application name of the I/O device 16 as an argument of the function call (step 6). For output operations, the handle (i.e., the address) of the data object 15 is also an argument of the function call. The OIOM 12 then begins execution of a protocol to communicate with the specific I/O device 16.

The OIOM 12 first queries the device dictionary 13 by executing a routine that returns the system name of the I/O device 16 and other current system parameters of the I/O device 16 (step 7) (e.g., the current status of the I/O device 16 with possible values such as enabled, disabled, busy).

The OIOM 12 then loads the I/O device module 14 (if it has not already been loaded) and if successful, the I/O device module 14 returns its address (steps 8a and 8b) which is stored as the system name of the I/O device 16 in the device dictionary 13. The OIOM 12 then queries the I/O device module 14 for its I/O device specific parameters which are returned as a parameter of the function call (steps 9a and 9b).

If the application program 11 is inputting a data object 15, the OIOM 12 then allocates memory for that object to the handle passed to it by the application program 11 (step 10). This memory allocation is based on the I/O device specific information obtained by the OIOM 12 from the I/O device 16. It is allocated in the application program's address space by assigning it to the handle created by the application program 11 and passed to the OIOM 12 when the application program 11 executed the OIOM's input or "capture" function in step 6. The OIOM 12 also fills in a description header in the data object 15 with I/O device specific values that is later used by the application program 11 to interpret the data object 15.

The OIOM 12 then commands the I/O device module 14 to input or output the data object 15 from or to the I/O device 16 (step 11) using the data object handle passed to the OIOM 12 in step 6. The I/O device module 14 executes the I/O device specific instructions to the I/O device 16 to input or output the data object 15 (step 12).

In OS/2, all communication between the OIOM 12 and an I/O device module 14 is accomplished through the execution by the OIOM 12 of specific entry points in the I/O device module 14 that are resolved after the module is linked dynamically to the OIOM 12. The OIOM 12 does this by first linking the I/O device module 14 using the system routine DosLoadModule to get the address of the module (step 8a). This routine returns the address of the I/O device module 14 (stored in the device dictionary 13 by the OIOM 12 as the system name of the I/O device 16). Next, the OIOM 12 dynamically links each specific entry point in the I/O device module 14 using the system routine DosGetProcAddr to obtain the address of a function that can then be dereferenced to execute the function. The dynamically linked function calls in the I/O device module 14, known by name only to the OIOM 12 when the OIOM 12 is compiled, are executed in steps 3, 9a, and 11 to obtain the application name of the I/O device 16, to get the I/O device specific parameters, and to input or output the data object 15, respectively.

After inputting or outputting the data object 15, the I/O device module 14 returns control to the OIOM 12 and passes back the handle to the data object 15 and the I/O device status (step 13). The OIOM 12 updates the status of the I/O device 16 in the device dictionary 13 (step 14) and returns control to the application program 11 (step 15). For input operations, the OIOM 12 passes to the application program 11 a handle to the data object 15. This handle is a parameter of the original OIOM "capture" function call executed by the application program 11 in step 6. After receiving control back from the OIOM 12, the application program 11 can process the data object 15 according to the I/O device specific information contained in the data object 15 (step 16).

One may now appreciate that the present invention provides a system and a method for inputting device specific data to, and outputting device specific data from, an application program that do not bind I/O device specific information to the application program until runtime. Consequently, the application program developer does not have to redesign the application program to accommodate the new I/O device specific information and then compile the new version of the application program in order to support a new I/O device.

Although the present invention has been shown and described with respect to a preferred embodiment in the form of digital image I/O, it is obvious that equivalent alterations and modifications will occur to others skilled in the art upon the reading and understanding of this specification. For example, another application of the present invention is motion control. In this application, outputs control motion actuators and inputs provide feedback from sensors, such as might be found in robotics. The present invention includes all such equivalent alterations and modifications and is limited only by the scope of the following claims.

What is claimed is:

1. A method for inputting data to, and outputting data from, an application program in a hardware independent manner, said method comprising the steps of:

providing a first I/O device which has hardware specific parameters;

assigning a system name to the first I/O device;

selecting the first I/O device by selecting of an I/O device application from a stored list of I/O device application names corresponding to a plurality of I/O devices;

storing the application names and the corresponding system names of the plurality of I/O device in a device dictionary;

determining the system name corresponding to the selected application name of the first I/O device using said device dictionary whereby the hardware specific parameters of the first I/O device may be identified;

loading a device module associated with the determined system name for the first I/0 device which contains the hardware specific parameters and hardware specific instructions relating to the first I/O device;

inputting/outputting a data object to/from the application program, whereby the data to/from the first selected I/O device is input/output;

constructing and formatting said data object for the first I/O device according to the I/O device application name and corresponding hardware specific parameters of the first I/O device associated with the determined system name, and commanding the device module to input/output the data object, whereby the device module executes the hardware specific instructions of the data object to the first I/O device to input/output the data object to/from the application program.

2. The method as defined in claim 1, further comprising the steps of:

providing a second I/O device having different hardware specific parameters than the first I/O device;

assigning a system name to the second I/O device;

determining the application name of the second I/O device;

determining the system name corresponding to the application name of the second I/O device whereby the hardware specific parameters of the second I/O device may be identified;

constructing a data object for the second I/O device that contains the data and the hardware specific parameters of the second I/O device, and inputting/outputting the data object for the second I/O device to/from the application program, whereby the data to/from the second I/O device is input/output to/from the application program.

3. A system for inputting data to, and outputting data from, an application program in a hardware independent manner, said system comprising:

a first I/O device which has predetermined hardware specific parameters;

means for assigning a system name to the first I/O device;

means for storing application names and corresponding system names of a plurality of I/O devices as data objects in a device dictionary;

means for determining an application name of the first I/O device in said device dictionary;

means for determining the system name corresponding to the application name of said first I/O device whereby the hardware specific parameters of said first I/O device may be identified;

means for loading a device module for said first I/O device that contains the hardware specific parameters and hardware specific instructions relating to said first I/O device as a data object;

means for constructing a data object that contains at least said application name, said system name, and the predetermined hardware specific parameters of said first I/O device, and means for commanding the device module to input/output the data object for the first I/O device, whereby the device module executes the hardware specific instructions to the first I/O device to input/output the data object to/from the application program.

4. The system as defined in claim 3, further comprising:

a second I/O device which has hardware specific parameters that are different than the hardware specific parameters of said first I/O device;

means for assigning a system name to said second I/O device;

means for determining the application name of said second I/O device;

means for determining the system name corresponding to the application name of said second I/O device whereby the hardware specific parameters of said second I/O device may be identified;

means for constructing a data object for the second I/O device that contains the data and the hardware specific parameters of said second I/O device; and means for inputting/outputting the data object for the second I/O device to/from the application program, whereby the data is input/output to/from the application program.

5. A system for managing flow of data between an application program and different input/output devices having unique data structures and hardware specific parameters, comprising, an object input/output manager for constructing data objects for input/output to/from input/output devices, an input/output device dictionary containing application names, system names, for each of the different input/output devices, the device dictionary providing to the object input/output manager system names and hardware specific parameters for input/output devices requested by the object input/output manager;

device modules containing data structures and hardware specific code organized according to specific entry points invoked by the input/output manager for each input/output device;

wherein the object input/output manager loads and queries a device module for a selected input/output device to obtain hardware specific parameters for the selected input/output device and constructs a data object for a selected input/output device which contains hardware specific parameters and hardware specific instructions for the selected input/output device, and commands a corresponding device module to input/output the data object by invoking the specific entry points in the device modules, whereby the device module executes the hardware specific instructions to the input/output device to input/output data to/from the application program.

6. The system of claim 5 wherein system names for the input/output devices are loaded by the object input/output manager in the device dictionary.

7. The system of claim 5 wherein the application program allocates a handle for the data object to the object input/output manager for input operations.

8. The system of claim 5 wherein the input/output device dictionary uniquely associates a system name and an application name for each input/output device.

9. The system of claim 5 wherein the device dictionary is used by an application program to generate a menu of input/output devices for selection by a user.

10. The system of claim 5 wherein the object input/output manager dynamically allocates memory for data objects based upon the hardware specific parameters of a selected input/output device.

11. The system of claim 5 wherein the device module has specific entry points invoked by the object input/output manager whereby the object input/output manager obtains an address of an application program function.

12. The system of claim 5 wherein the device module returns control to the object input/output manager after executing the hardware specific instructions to the input/output device to input/output the data object.

* * * * *